United States Patent [19]

Olsson et al.

[11] Patent Number: 4,640,234

[45] Date of Patent: Feb. 3, 1987

[54] METHOD OF RUNNING AN INTERNAL COMBUSTION ENGINE WITH ALTERNATIVE FUELS

[75] Inventors: John Olsson; Bertil Olsson; Gunnar Olsson, all of Partille, Sweden

[73] Assignee: J-Jet Konstruktion HB, Partille, Sweden

[21] Appl. No.: 704,928

[22] Filed: Feb. 25, 1985

Related U.S. Application Data

[63] Continuation-in-part of Ser. No. 513,118, Jun. 15, 1983, Pat. No. 4,548,187.

[30] Foreign Application Priority Data

Oct. 16, 1981 [SE] Sweden ............................. 8106113

[51] Int. Cl.$^4$ ............................................. F02M 31/00
[52] U.S. Cl. ................................. 123/557; 123/25 C; 123/308
[58] Field of Search ............... 123/557, 478, 525, 575, 123/25 C, 25 D, 25 B, 308, 198 A

[56] References Cited

U.S. PATENT DOCUMENTS

| | | | |
|---|---|---|---|
| 1,776,943 | 9/1930 | Douthit | 123/25 C |
| 2,218,522 | 10/1940 | Butler | 123/25 C |
| 4,018,192 | 4/1977 | Eft | 123/25 C |
| 4,331,116 | 5/1982 | Simonds | 123/557 |
| 4,372,278 | 2/1983 | Smith | 123/557 |

Primary Examiner—Ronald H. Lazarus
Attorney, Agent, or Firm—Holman & Stern

[57] ABSTRACT

A method of operating an internal combustion engine with alternative preheated fuels, or mixtures thereof, at the same compression ratio and supplied with an additional medium for the operation comprises
 detecting the flow of air drawn into the engine through the air intake,
 proportioning and distributing the fuel to each cylinder in response to at least detected flow,
 heating the fuel fed to each cylinder to a temperature between its flame temperature and above its evaporation temperature, but below its auto ignition temperature, and
 injecting the heated fuel and the additional medium in a controlled amount into each cylinder through separate feed means at different angles with respect to the wall of the respective cylinder.

16 Claims, 9 Drawing Figures

METHOD OF RUNNING AN INTERNAL COMBUSTION ENGINE WITH ALTERNATIVE FUELS

This is a continuation-in-part application of U.S. Ser. No. 06/513,118, filed June 15, 1983 now U.S. Pat. No. 4,548,187.

BACKGROUND OF THE INVENTION

1. Field of the Invention

This invention relates to a method of operating an internal combustion engine having at least one cylinder with alternative preheated fuels or mixtures thereof, at the same compression ratio and supplied with an additional medium for the operation.

2. Description of the Prior Art

Today there is no possibility to use more or less all existing fuels in the same engine without changing the compression ratio.

In order to be able to use thicker oils in diesel engines it has previously been suggested to heat the fuel by the heat from the exhaust gases to achieve lower viscosity, wherein compression heat is consumed for vaporizing and combusting the oil. In this way a lower compression and/or higher power output and usage of thicker oil have been made possible.

It has also been suggested to heat the fuel before it enters the intake manifold, in order to reduce unpleasant discharge of exhaust gases at low engine speed.

With direct injection internal combustion engines it is further known to use preheated air for the intake-manifold at idling and low-load-condition. Attempts are made to achieve cleaner exhaust gases and lower fuel consumption at idling and low-load-condition in this way.

In previously known mechanically controlled gasoline injection systems the injection is performed continuously and needs no driving from the engine. The amount of fuel injected is regulated by the amount of air that is sucked into each cylinder.

All these known proposed improvements solve some minor problems, but none of them solve the problem of running an internal combustion engine, for example an Otto-engine, with a great number of alternative fuels.

BRIEF SUMMARY OF THE INVENTION

The object of this invention is to provide a method of running an internal combustion engine with alternative fuels. With a regulating lever at the dashboard you can switch from one fuel to another, even if the engine has a high compression ratio and is a two-or four-stroke engine with conventional ignition system. The running of the engine will be non-detonating, provide improved fuel-economy, cleaner exhaust gases and will not shorten the life of the engine.

These objects have been achieved by: detecting the flow of air drawn into the engine through the air intake;

proportioning and distributing the fuel to each cylinder in response to at least the said flow;

heating the fuel fed to each cylinder to a temperature between its flame temperature and above its evaporation temperature but below its auto ignition temperature; and injecting the heated fuel and the additional medium in a controlled amount into each cylinder through separate feed means at different angels with respect to the wall of the respective cylinder.

BRIEF DESCRIPTION OF THE DRAWINGS

The invention will now be described in greater detail with reference to the accompanying drawings wherein.

DETAILED DESCRIPTION

Figure 1:
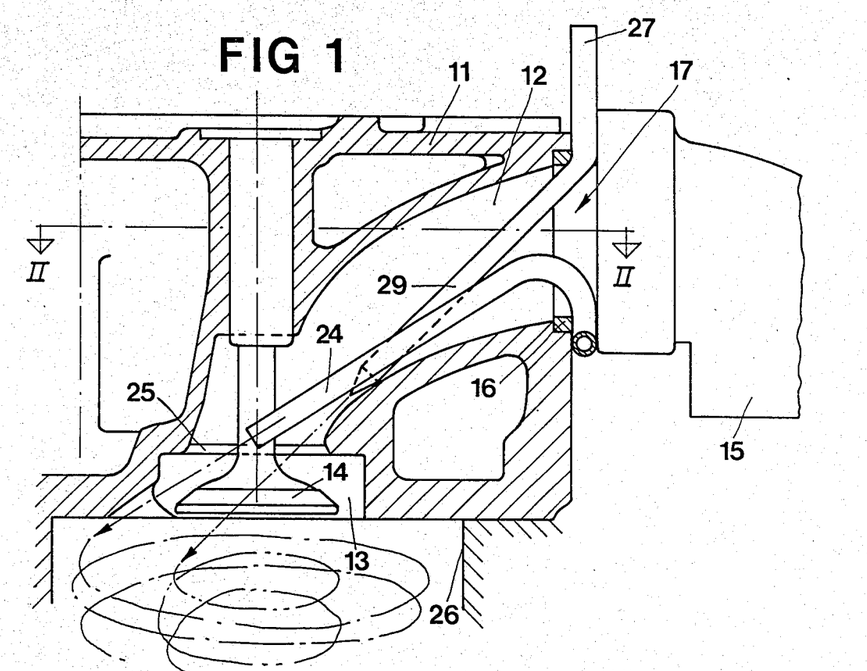
FIG. 1 is a fragmentary, cross-sectional view of a cylinder head showing the inlet valve in accordance with the invention.
Figure 2:
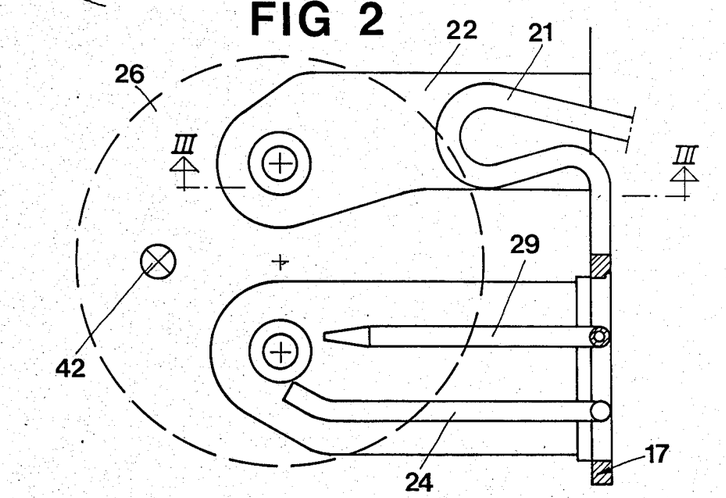
FIG. 2 is a cross-sectional view taken on line II—II in FIG. 1.

In the drawings the numeral 11 refers to a cylinder head of an internal combustion engine 10. 12 is the inlet to the combustion chamber 13, 14 is an inlet valve, and 15 is the inlet manifold.

Figure 3:
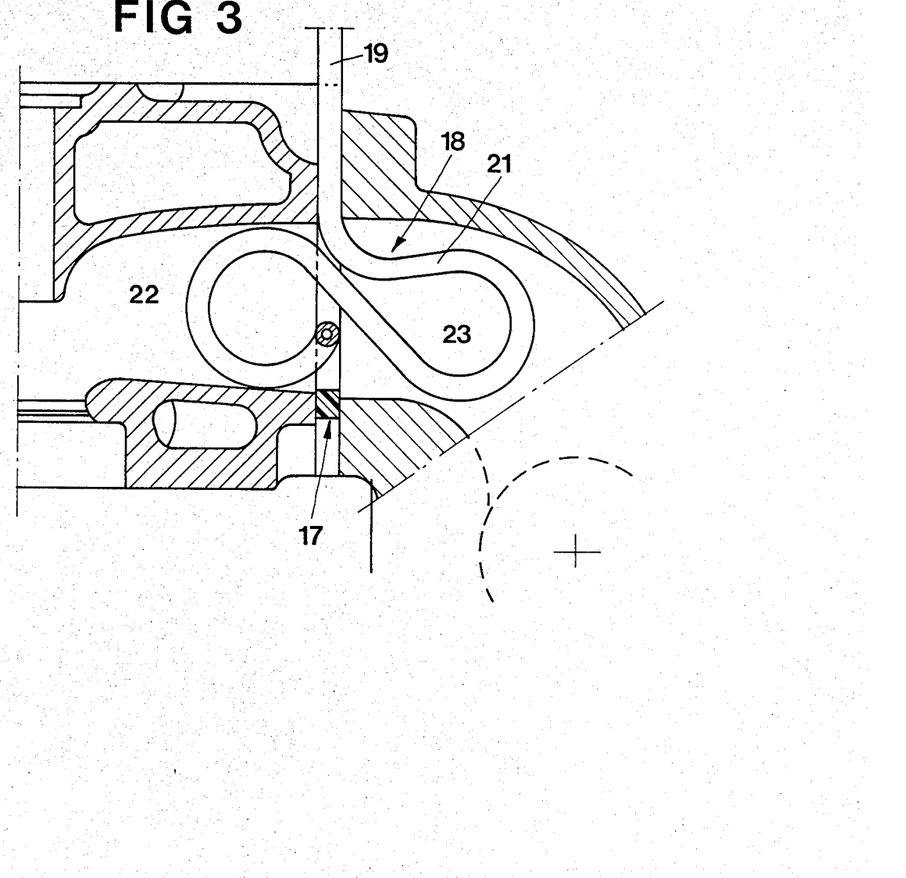
FIG. 3 is a cross-sectional view taken along line III—III in FIG. 2.

Between the manifold and the inlet port 16 is a spacer 17 which in its outer shape looks like the normal gasket. In the spacer 17 are arranged fuel lines 18 (FIG. 3) one to each cylinder. The fuel pipe comprises a fitting 19 connected to a fuel feeding device 20, a heat exchanger loop 21, which is partly positioned in the outlet channel in the exhaust gas channel of the respective cylinder 22 and partly in the exhaust manifold 23. The fuel pipe further comprises an injection part 24, which is directed towards the gap of the inlet valve 14 in such a manner that a flat tangential angle is achieved with respect to the cylinder wall 26.

The spacer 17 is also provided with a feeding line 27 which is fitted to a second feeding device 28 coupled in series with the feeding device 20 and feeding the engine with another medium, for example water and an anti-freezing agent. The feeding line 27 is in the inlet channel equipped with a nozzle 29, which is directed at a steeper angle than the injection part 24, towards the gap of the inlet valve. The venturi tube of the nozzle 29 has a relatively small opening, causing a thin jet or spray of water.

Figure 5:
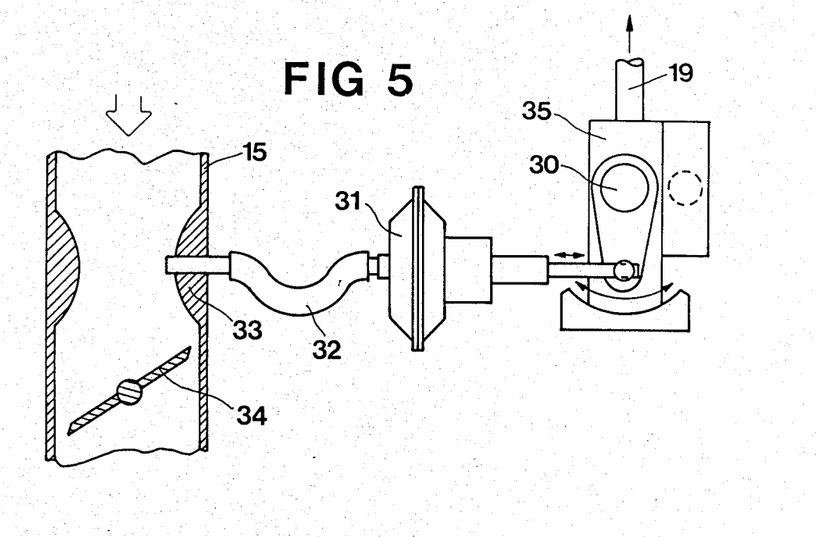
FIG. 5 is a schematic end view of the feeding device together with the regulating unit.

The fuel feeding device 20 and the water feeding device 28, which are of the same principal construction, distribute the fuel and the water respectively in relation to the amount of air sucked into the engine cylinders (FIG. 5). A distributing valve 30, which is pivoted about its longitudinal axis, distributes the fuel and the water (if needed), dependent on the pivoting movement of the valve, to the respective cylinder through the fitting 19 of the fuel pipe 18 and the feeding line 27 respectively. Both distributing valves 30 of the feeding devices 20 and 28, are joined together and are both regulated by a vacuum diaphragm 31 (FIG. 5), which through the line 32 communicates with a venturi 33 in the air intake 15, which as seen in the direction of the air flow is positioned in front of the throttle 34. The distributor casing 35 of the feeding devices 20, 28 is pivotally mounted about the distributor valve 30 for adjusting the fuel amount.

If it is not possible to arrange a spacer 17, the heat exchanger 21 can be mounted directly in the outlet manifold.

THE FUNCTION OF THE ENGINE

Figure 4:
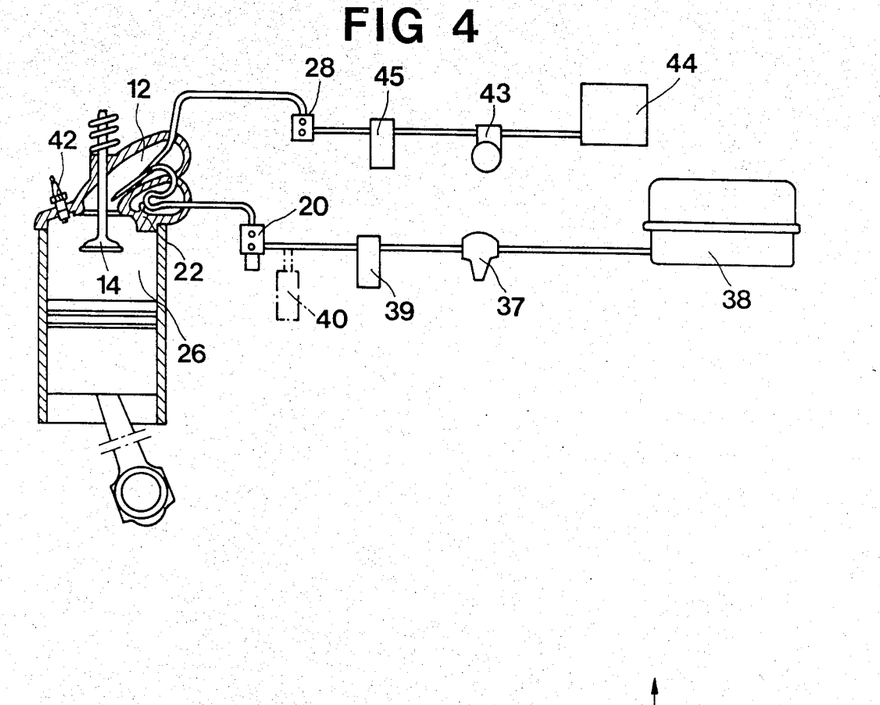
FIG. 4 is a schematic drawing of the engine and its fuel system.

The fuel is pumped in a conventional manner by a standard fuel pump 37 (FIG. 4) from the tank 38 through a fuel filter 39 and if needed a pressure accumulator 40 to the feeding device 20. The fuel is proportioned and distributed in the feeding device and conveyed through the fuel pipe to the heat exchanger 21 in the outlet channel 22, 23, where the fuel is heated up to a temperature between its flame temperature and above its evaporation temperature but below its auto ignition temperature. When starting or with insufficient heat-absorption in the exhaust channel, extra heat may be added to the fuel by an electric heater, for example by making injection part 24 of the fuel lines 18 of a resistance material (i.e. Kanthal), and supply this part with electric current.

Through the special way the injection part 24 is directed, the evaporated fuel will be injected in a relative flat path towards the cylinder wall 26 where the fuel will circulate in a spiral passing the spark plug 42 as a final phase of the injection stroke, whereby a lean fuel-air-mixture is achieved, which gives a good combustion and a low fuel consumption.

In order to make it possible to use alternative fuels without changing the compression ratio it is possible to add water in a controlled amount and distribute into the combustion chamber. Water is pumped by a water pump 43 from the water tank 44 by way of the filter 45 to the feeding-device 28. The water distribution line 27 from the feeding device 28 is with its nozzle portion located at the intake channel 12 arranged in such an angle that the water jet will enter at a steeper angle than the injected fuel. The fine water jet from the nozzle portion 29 will enter in a spiral inside the path of the fuel. The purpose of the water injection is to prevent predetonation by cooling and cut off the detonation peak which appears when the motor is run on e.g. 20-octane fuel instead of e.g. the required 98-octane fuel. The energy taken from the detonation peak is consumed for evaporating the water and alcohol, thus causing a steam engine-effect and decomposing the alcohol in different more combustible radicals. This contributes to a cleaner engine and cleaner exhaust gases.

Figure 6:
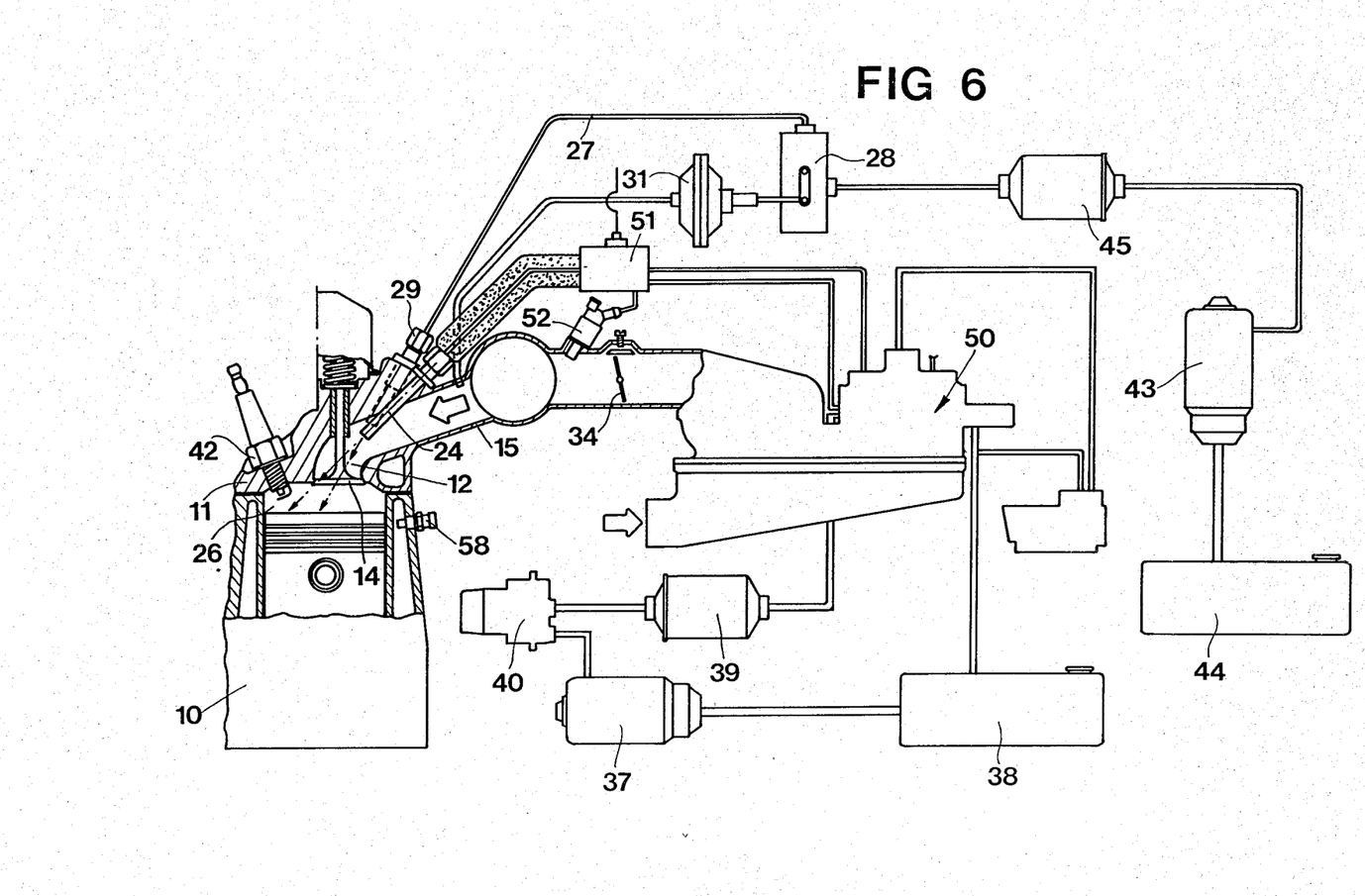
FIG. 6 is a schematic diagram of a modified mechanical fuel injection system for combustion engines.

In FIG. 6 is shown a mechanical injection system designed for combustion engines. It works continously without transmission from the engine. The fuel is sucked from the tank 38 by an electric fuel pump 37 and fed through a pressure regulator 40 and a filter 39 to a known fuel measuring arrangment 50. This is also comprising an airflow meter (not shown) which measures the amount of air sucked in at any moment. The amount of air sucked in varies with the position of the gas pedal, that is the angle of the throttle 34, the rpm of the engine, and the engine load. The deflection of the air meter is regulating the steering piston in the fuel measurer 50, which is regulating the stearing piston in the fuel measurer 50 which is regulating the amount of fuel in proportion to the air sucked in. From the fuel meter the fuel is fed to a heater 51 where the fuel is heated to a temperature between its flame temperature and above its evaporation temperature, though below its auto ignition temperature. From the heater 51 the heated fuel is led to a fuel nozzle 24 which continuously is spraying the fuel vapors created after the fuel valve 24 into the inlet channel 12 to the combustion chamber. The mixture of fuel vapors and air is sucked in to each cylinder when the inlet valve is opened.

For cold start, warming up and full load the fuel/air mixture automatically is made richer through an electric starting valve 52, that injects extra fuel when the engine is started. This additional fuel is also heated up preferably through the heater 51. This heater is preferably heated by the exhaust system and/or the cool water system. In certain cases it may be necessary to apply an additional heater which can be an electrical.

In a similar way, as in the example shown in FIG. 5, the air-pressure variations below the throttle 34 in the inlet channel 15 are used for regulating the feed-device 28 that is feeding the extra medium, for example water, which is injected in to the cylinder through the fuel valve or throttle.

Figure 7:
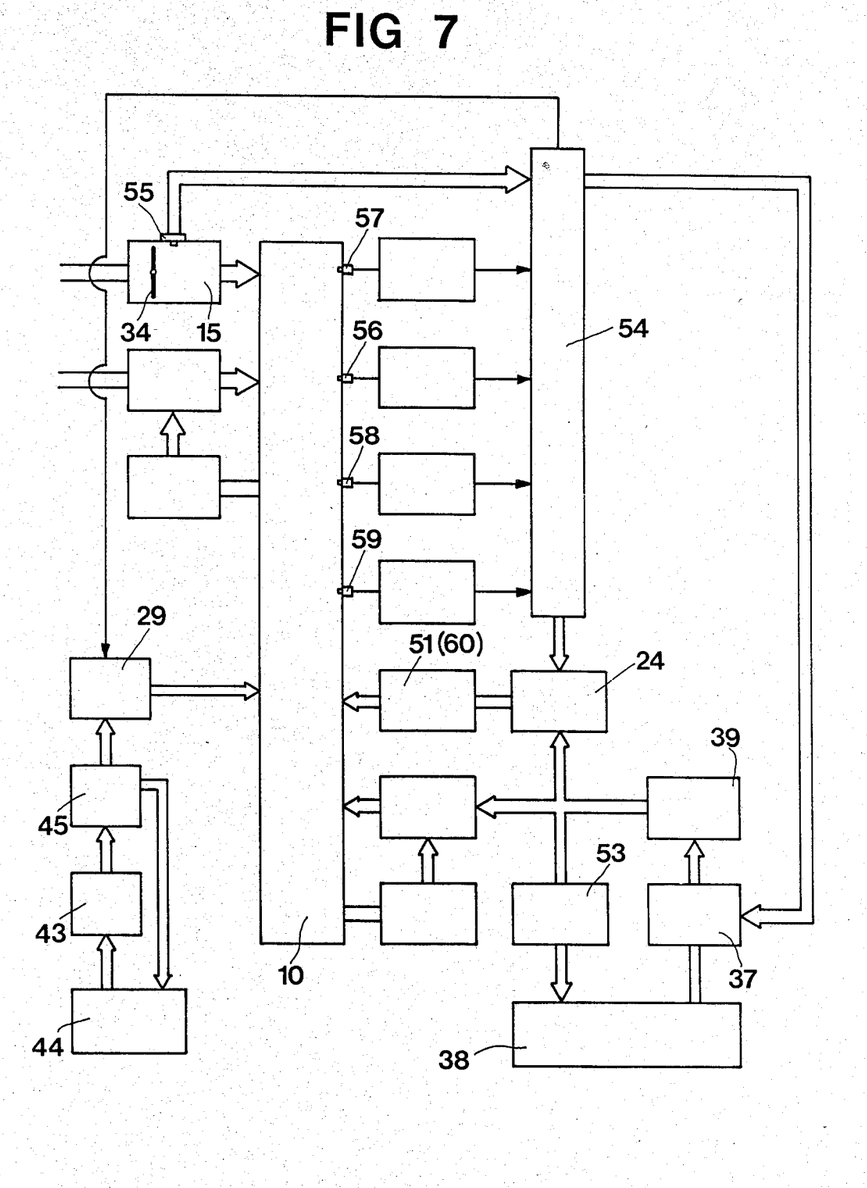
FIG. 7 is a block diagram of an electronic fuel injection system according to the invention.
Figure 8:
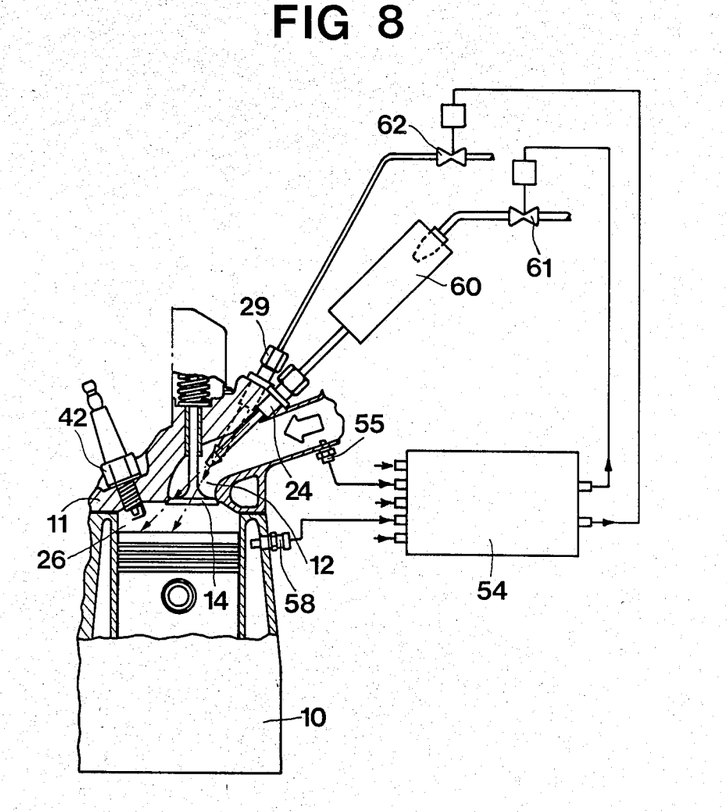
FIG. 8 is a diagrammatic, partially cross-sectional view of an internal combustion engine showing the construction for vaporizing the fuel outside the engine.

The invention may with the same good result be applied on a combustion engine equipped with an electronic fuel-injection system, as shown in the examples in FIGS. 7 and 8. In these examples 38 is the fuel tank, 37 a fuel pump dimensioned to create the suitable injection pressure. 39 is a filter and 53 is a pressure regulator with overflow-return to the fuel tank. The capacity of this fuel pump is higher than the maximum amount required. This is for reducing the risk of vapor lock. The pressurized fuel is fed to the injection nozzles (fuel valves) 24, which are electromagnetically operated. They feed the fuel to the engine 10 in accordance with load, rpm and throttle opening. The injection time of the fuel valves 24 is regulated by the electronic unit 54 which combines the information of the running conditions. These are with the electronic fuel injection characterized by the rpm and the air pressure in the inlet channel. To determine the air pressure there are pressure transducers 55 mounted before and after the throttle 34, which measure the air pressure in the inlet manifold. For measurement of the rpm an impulse releaser 56 is used. Further there is a pressure transducer 57, for indicating the load pressure, mounted in the cylinder liner, a temperature sensing transducer 58 for indicating the coolwater temperature and another temperature sensing transducer 59 for reporting the temperature of the inlet air. All these parameters are used to guide the fuel valves 24 to a perfect motor function during all running conditions. The electronic unit 54 is also guiding the fuel valves 29 for the further medium, for example water, which is sucked up by a pump 43 from a tank 44 and is pressed through a filter 45 to said fuel valves 29.

As shown in FIG. 7 the pressurized fuel first passes the injection valve 24 and then enters the heat exchanger 51, one for each valve, or a vaporizer 60 in accordance with FIG. 8. In this example the vaporization of the fuel is produced through a pressure depression in said vaporizer 60. In this case there is no need to supply heat for vaporizing the fuel. The additional medium is supplied in the same way as earlier described.

As readily understood any injection system can be used such as for example GM's EFI or DFI (Electric Fuel Injection or Digital Fuel Injection).

Figure 9:
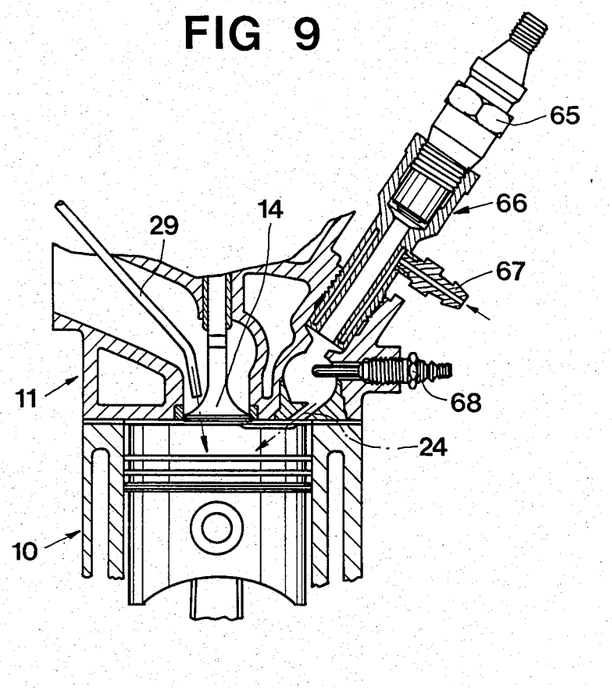
FIG. 9 is a cross-sectional view of a compression ignition engine with the arrangements according to the invention.

In FIG. 9 is shown the invention applied in a compression ignition engine (Diesel engine), where the ordinary place for the injection valve 65 in the cylinder head has been used for an insert 66, which principally consists of an axial heating chamber with an inlet 67 and an outlet (not shown) for a heating medium, for example the exhaust gas from the engine. The insert 66 is outside the cylinder head and is provided with a screw connection for the diesel fuel injection valve.

68 is a heater plug and 29 is the nozzle for the additional medium. Also in this embodiment the nozzle 29 is arranged in a steeper angular relation to the cylinders longitudinal axis compared with the injection valve for the diesel fuel.

TEST RESULTS

Practical tests with stationary engines as well as boat- and car engines in traffic have shown very good results. Using 98-octane preheated gasoline without water injection and under full load, the fuel consumption at 2600 rpm was 178 gr/hph, while when using the carburetor, under the same conditions the fuel consumption was 242 gr/hph.

When using diesel oil as fuel in the same engine as above and with a 25% mixture of gasoline plus water injection we have measured a fuel consumption of 200-220 gr/hph at full load and 3000 rpm.

When using pure diesel oil a fuel consumption of about 180 gr/hph and a water-methanol-consumption (50/50%) of 90 gr/hph could be noticed at full load at 3000 rpm. The compression ratio for the engine was 9:1 and the compression pressure was 11,6.

Tests performed by impartial institutes under controlled combustion conditions show the following fuel consumption for a Volvo B-18 engine at 5000 rpm under full load:

| Conventional carburator | 96-octane gasoline | | 12.1 lit/hour |
|---|---|---|---|
| Invention | paraffin + water | 9.3 + 0.6 | 9.9 lit/hour |
| Invention | Diesel Oil + water | 7.0 + 1.0 | 8.0 lit/hour |

The invention gives a considerable reduction of the fuel consumption compared with conventional techniques. At the same time it is possible to use fuel with very low octane numbers, which provides an option between high- and low octane gasoline, paraffin, Diesel oil, ethanol and/or methanol at the same compression ratio.

It should be understood, that the invention is not limited to the embodiment shown and described, but a plurality of modifications are possible within the scope of the claims. Terms such as "heated" or "pre-heated" are to be understood in the broadest meaning. The heat can be achieved by different heating means and even through pressure depression.

We claim:

1. In a method of operating an internal combustion engine with one of a plurality of alternative fuels, the engine having at least one cylinder, an air intake and an inlet valve in an inlet port for the at least one cylinder, wherein the fuel is fed to the at least one cylinder through fuel feed lines and is preheated, and an additional medium is fed to the at least one cylinder, the improvement comprising:

detecting the flow of air drawn into the engine through the air intake;
   proportioning and distributing the fuel to be fed to the at least one cylinder in response to at least said detected flow of air;
   heating the fuel after said proportioning step to a temperature between the flame temperature and evaporation temperature of the fuel but below the auto ignition temperature of the fuel;
   injecting the heated fuel through the inlet valve port at a substantially flat, tangential angle with respect to the wall of said at least one cylinder;
   injecting the additional medium in a controlled amount into said at least one cylinder within the flow path of the fuel and at a steeper angle with respect to the cylinder wall than said fuel injection; and
   operating the engine at the same compression ratio irrespective of the alternative fuel being used.

2. The method as claimed in claim 1 wherein:
said alternative fuels comprise high octane gasoline.

3. The method as claimed in claim 1 wherein:
said alternative fuels comprise low octane gasoline.

4. The method as claimed in claim 1 wherein:
said alternative fuels comprise mixtures of different fuels.

5. The method as claimed in claim 4 wherein:
said different fuels comprise high and low octane gasolines.

6. The method as claimed in claim 4 wherein:
said different fuels comprise diesel oil and gasoline; gasoline constitutes approximately 25% of said mixture; and
said additional medium comprises water.

7. The method as claimed in claim 1 wherein:
said alternative fuels comprise paraffin.

8. The method as claimed in claim 1 wherein:
said alternative fuels comprise alcohol.

9. The method as claimed in claim 2 wherein:
said additional medium comprises water.

10. The method as claimed in claim 3 wherein:
said additional medium comprises water.

11. The method as claimed in claim 2 wherein:
said additional medium comprises a mixture of water and an anti-freezing agent.

12. The method as claimed in claim 10 wherein:
said additional medium comprises a mixture of water and an anti-freezing agent.

13. The method as claimed in claim 1 wherein:
said additional medium comprises water.

14. The method as claimed in claim 1 wherein:
said additional medium comprises a mixture of water and an anti-freezing agent.

15. The method as claimed in claim 7 wherein:
said additional medium comprises water.

16. The method as claimed in claim 8 wherein:
said additional medium comprises water.

* * * * *